United States Patent [19]
Otto et al.

[11] Patent Number: 5,237,608
[45] Date of Patent: Aug. 17, 1993

[54] TELEPHONE STATION HAVING A HOUSING WITH ELECTROSTATIC PROTECTION

[75] Inventors: Peter Otto, Munich; Klaus Wechsler, Puchheim, both of Fed. Rep. of Germany

[73] Assignee: Siemens Aktiengesellschaft, Munich, Fed. Rep. of Germany

[21] Appl. No.: 835,120

[22] Filed: Feb. 14, 1992

Related U.S. Application Data

[63] Continuation of Ser. No. 470,719, Jan. 26, 1990, abandoned.

[30] Foreign Application Priority Data

Jan. 30, 1989 [DE] Fed. Rep. of Germany ....... 3902683

[51] Int. Cl.⁵ .............................................. H04M 1/00
[52] U.S. Cl. .................................... 379/436; 379/437
[58] Field of Search ............... 379/419, 428, 429, 432, 379/434, 436, 437, 440, 441; 361/220

[56] References Cited

U.S. PATENT DOCUMENTS

| | | | |
|---|---|---|---|
| 2,478,469 | 8/1949 | Earle | 379/436 |
| 2,578,367 | 12/1951 | Mott | 379/432 |
| 2,754,371 | 7/1956 | Droel | 379/436 |
| 2,990,456 | 6/1961 | Nise | 379/436 |
| 3,303,291 | 2/1967 | Schoemann | 379/436 |
| 3,657,487 | 4/1972 | Schwanck et al. | 379/436 |
| 4,658,421 | 4/1987 | Bohannon | 379/436 |
| 4,773,090 | 9/1988 | Goatman | 379/429 |
| 4,821,320 | 4/1989 | Andert et al. | 379/437 |
| 4,868,876 | 9/1989 | Schiller et al. | 379/437 |
| 5,029,041 | 7/1991 | Robinson et al. | 361/220 |
| 5,067,151 | 11/1991 | Inagaki et al. | 379/433 |

FOREIGN PATENT DOCUMENTS

| | | | |
|---|---|---|---|
| 0281942 | 10/1966 | Australia | 379/436 |
| 0929178 | 6/1963 | United Kingdom | 379/436 |

Primary Examiner—Curtis Kuntz
Assistant Examiner—William D. Cumming
Attorney, Agent, or Firm—Hill, Steadman & Simpson

[57] ABSTRACT

A telephone station is composed of a handset and a housing composed of an upper housing part and a bottom tub. In order to reduce the risk of an arc-over due to electrostatic discharge between the joining locations of the bottom tub and the upper housing part to damage the electronic components in the interior of the telephone housing, the upper housing part has an edge region which overlaps a rim provided on the bottom tub with a substantially large amount of overlap.

8 Claims, 1 Drawing Sheet

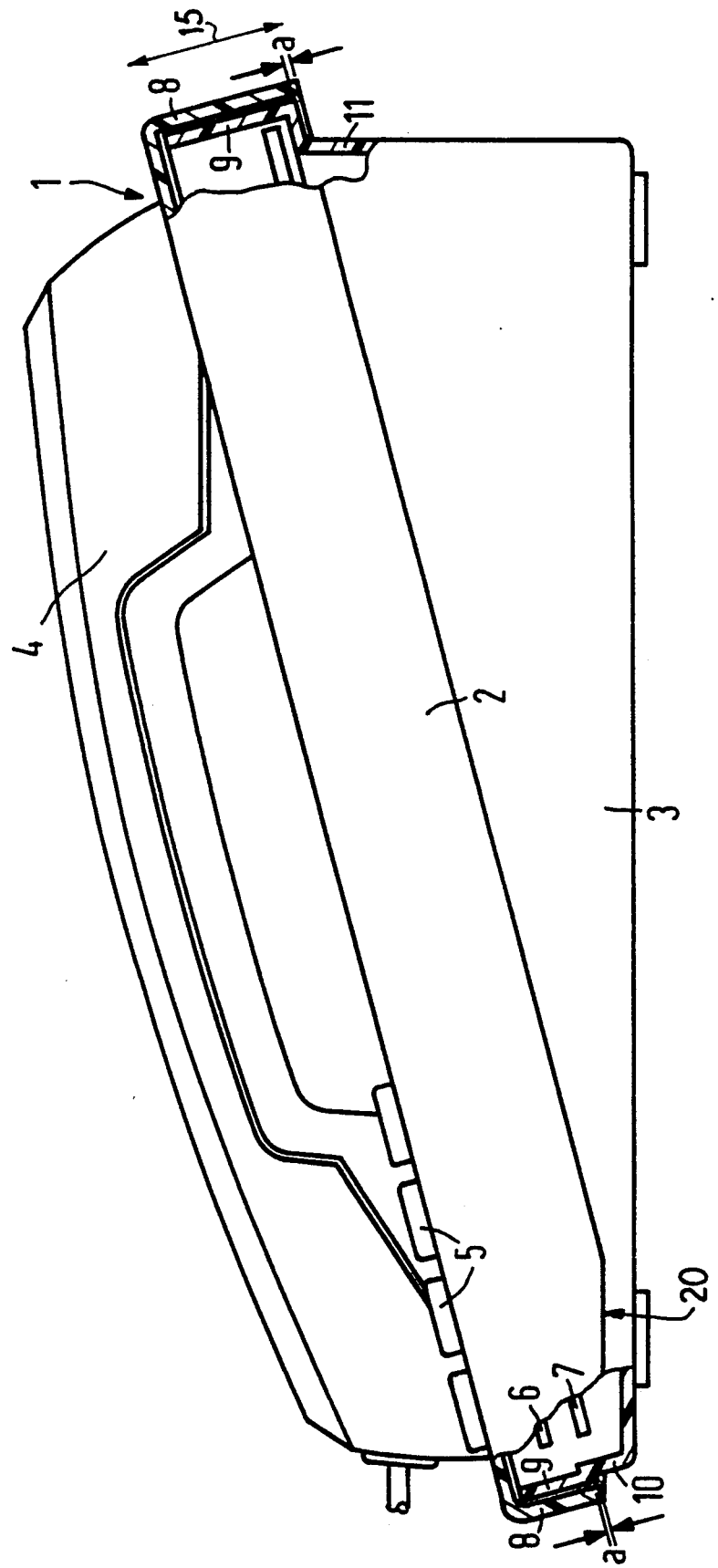

TELEPHONE STATION HAVING A HOUSING WITH ELECTROSTATIC PROTECTION

This is a continuation of application Ser. No. 07/470,719, filed Jan. 26, 1990, abandoned.

BACKGROUND OF THE INVENTION

The present invention is directed to a telephone station which has a handset and a housing that is composed of a bottom tub or base and an upper housing part.

A telephone station has a housing which is usually formed by a bottom tub or base and an upper housing part, which are secured to one another by screws or a snap-in connection. The bottom tub usually has a relatively small edge region offset in steps in an inward direction, and this edge region serves for the guidance of the upper housing part on the bottom tub in order to facilitate assembly. An all around gap will, thus, remain between the two housing parts at their joining location.

Modern floor coverings of plastic and synthetic clothing of operators leads to a high electrostatic charging of the operator, particularly given low relative humidity. It is not unusual for the voltage of these charges to reach a value of 20 kV. In addition to an uncomfortable, negative influence on the operator due to arcing from the hand of the person to the housing of the telephone station, this discharge or arc will also cause disturbances in the telephone station. In modern telephone stations, in particular those which have integrated circuits, these circuits are jeopardized, since arc-overs penetrating through the all around gap between the housing parts can lead to the destruction of electronic components secured on printed circuit boards and arranged in the bottom tub or base.

SUMMARY OF THE INVENTION

It is an object of the present invention to largely suppress the risk of an arc-over due to electrostatic discharge in the region of the joining location of the bottom tub and upper housing part to the electrical components arranged within the telephone station.

This object is inventively achieved in that the connecting region of the upper housing part to the bottom tub has its edge region adapted to the outside contour of the bottom tub and has its edge region overlapping the bottom tub over a larger area.

Due to this structural measure, the air path through the joining location and to the electronic components is enlarged in a simple way so that a balancing of potential between the operator and the electronic components is made significantly more difficult. In order to compensate manufacturing tolerances in the manufacture of the upper housing part, the edge region of the upper housing part can be fashioned such that it overlaps the bottom tub with a slight excess dimension.

Other objects and advantages of the invention will be readily apparent from the following description of the preferred embodiment, the drawing and claims.

BRIEF DESCRIPTION OF THE DRAWING

The FIGURE is a side view with portions broken away for purposes of illustration of a telephone station in accordance with the present invention.

DESCRIPTION OF THE PREFERRED EMBODIMENTS

The principles of the present invention are particularly useful when incorporated in a telephone station, generally indicated at 1 in the FIGURE. The telephone station 1 is composed of an upper housing part 2 and a second housing part, which is formed by a bottom tub or base 3, that are connected together to form an interior space in the housing. In addition, the telephone station will have a handset 4 that can be laid on the upper housing part 2. Individual keys 5 of the telephone keyboard may be seen in the upper housing part. In addition, printed circuit boards, such as 6 and 7, are held in the bottom tub or base 3.

Modern floor coverings of plastic, as well as the synthetic clothing of the operator, will lead to a high electrostatic charging of the operator, particularly when there is a low relative humidity. It is not unusual for the voltage to reach values of above 20 kV. In addition to unpleasant, negative influences on the operator due to the sparking or arcing from the hand of the operator to the housing of the telephone station, functional disturbances in the sensitive, electronic components, that are currently on the printed circuit boards 6 and 7, will also occur.

As illustrated, the base or bottom tub 3 has upstanding side walls, such as 10 and 11, which, then, have a joining region or a continuous peripheral rim 9. As illustrated, the upstanding side walls, such as 10 and 11, are stepped inward toward each other relative to the rim 9. In order to largely reduce such electrostatic discharges, the upper housing part 2 has a downwardly extending continuous peripheral edge region or rim 8 in the region of the joining location which region 8 overlaps or telescopically receives the rim 9 of the bottom tub 3. In order to compensate for manufacturing tolerances in the manufacture of the upper housing part 2, the edge region or rim 8 overlaps the rim 9 of the bottom tub 3 with an excess dimension a along a width of the rims 8 and 9 as indicated by double arrows 15. Due to the amount of overlapping between the edge region 8 and the rim 9, an electrostatic arc-over path between the overlapping rims 8 and 9 is significantly lengthened in a simple way so that a bielectrical strength is considerably enhanced to prevent damage to the components in the interior of the housing.

The width of both rims 8 and 9 can have a changing dimension. As illustrated, the rims 8 and 9 on the left-hand side of the FIGURE are less than the width of the rims at the right-hand side. The FIGURE shows this change occurring at 20 for the rim 8.

Although various minor modifications may be suggested by those versed in the art, it should be understood that we wish to embody within the scope of the patent granted hereon all such modifications as reasonably and properly come within the scope of our contribution to the art.

We claim:

1. In a telephone station having a handset and a housing which is composed of a bottom tub and an upper housing part which forms an interior space for receiving sensitive electronic component parts, the improvements comprising said housing having means for preventing a voltage arc-over between a user and the sensitive electronic component parts from passing through a joining location between the tub and upper housing part, said means being formed by a continuous peripheral upper rim of the bottom tub and a matching continuous peripheral edge region with a free edge of the upper housing part, said bottom tub having upstanding walls and said upper rim portion being connected to said upstanding walls by a step causing the rim to extend outward from the upstanding walls, said edge region having a width greater than a corresponding width of the upper rim portion so that when the rim portion is telescopically received in the edge region, the free edge of the edge region extends beyond said stepped shoulders.

2. In a telephone station according to claim 1, wherein the width of said rim portion has a changing dimension.

3. In a telephone station according to claim 1, wherein the edge region extends substantially at right angles to the remaining portion of said upper housing part.

4. In a telephone station according to claim 3, wherein the width of said rim has a changing dimension and the width of said edge region of the housing part has a changing dimension corresponding to the changing dimension of the width of the rim.

5. A telephone station comprising a handset; a housing comprised of a bottom tub having an upstanding wall coacting with an upper housing part to form an interior space; and sensitive electronic component parts being arranged in said interior space, said housing having means for preventing a voltage arc-over between a user and the sensitive electronic component parts from passing through a joining location between the tub and upper housing part, said means being formed by a continuous peripheral upper rim being connected to said upstanding wall of the bottom part by an outward stepped shoulder causing the rim to extend outward from the upstanding wall and a matching continuous peripheral edge region with a free edge of the upper housing part, said edge region having a width greater than a corresponding width of the upper rim portion and telescopically receiving the rim portion with the free edge of the edge region extending beyond said stepped shoulder, said rim and edge region having a width to provide an increased resistance to a passage of a voltage arc-over between the rim and edge region and into the interior space of the housing.

6. A telephone station according to claim 5, wherein the width of said rim portion has a changing dimension.

7. A telephone station according to claim 5, wherein the peripheral edge region extends substantially at right angles to a remaining portion of said upper housing part.

8. A telephone station according to claim 7, wherein the width of said rim has a changing dimension and the width of said peripheral edge region of the housing part has a changing dimension corresponding to the changing dimension of the width of the rim.

* * * * *